US011175758B2

(12) United States Patent
Yin et al.

(10) Patent No.: US 11,175,758 B2
(45) Date of Patent: Nov. 16, 2021

(54) WEARABLE CONTROL DEVICE, VIRTUAL/AUGMENTED REALITY SYSTEM AND CONTROL METHOD

(71) Applicant: Beijing Xiaomi Mobile Software Co., Ltd., Beijing (CN)

(72) Inventors: Daniel Yin, Beijing (CN); Xingsheng Lin, Beijing (CN); Jiasong Ji, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/695,739

(22) Filed: Nov. 26, 2019

(65) Prior Publication Data
US 2020/0409482 A1 Dec. 31, 2020

(30) Foreign Application Priority Data

Jun. 26, 2019 (CN) .......................... 201910563002.4

(51) Int. Cl.
*G06F 3/033* (2013.01)
*G06F 3/038* (2013.01)
(Continued)

(52) U.S. Cl.
CPC .......... *G06F 3/0383* (2013.01); *G06F 3/0202* (2013.01); *G06F 3/0362* (2013.01);
(Continued)

(58) Field of Classification Search
CPC .... G06F 3/0383; G06F 3/0362; G06F 3/0202; G06F 1/163; G06F 3/011; G06F 3/04847; G10L 15/26; G10L 15/22
See application file for complete search history.

(56) References Cited

U.S. PATENT DOCUMENTS

| 6,443,347 B1 * | 9/2002 | Elizalde | A45F 3/14 |
| | | | 224/245 |
| 2003/0184602 A1 * | 10/2003 | Kuroki | G02B 27/017 |
| | | | 715/856 |

(Continued)

FOREIGN PATENT DOCUMENTS

| CN | 207083081 U | 3/2018 |
| CN | 207232524 U | 4/2018 |

(Continued)

OTHER PUBLICATIONS

First Office Action of Russian Application No. 2019139487/07 dated Jul. 31, 2020.

(Continued)

*Primary Examiner* — Adam J Snyder
(74) *Attorney, Agent, or Firm* — Finnegan, Henderson, Farabow, Garrett & Dunner, L.L.P.

(57) ABSTRACT

A wearable control device for connecting with a head-mounted audio-visual device, includes: a housing including a top housing portion and a bottom housing portion arranged in parallel, wherein a gap is formed between two opposite surfaces of the top housing portion and the bottom housing portion, and tail portions of the top housing portion and the bottom housing portion are connected through a transition portion; at least one physical remote control unit disposed on a top surface of the top housing portion; and a processor disposed inside the housing and electrically connected with the physical remote control unit.

12 Claims, 8 Drawing Sheets

(51) Int. Cl.
*G06F 3/02* (2006.01)
*G06F 3/0362* (2013.01)
*G10L 15/22* (2006.01)
*G10L 15/26* (2006.01)
*G06F 3/0484* (2013.01)
*G06F 1/16* (2006.01)
*G06F 3/01* (2006.01)

(52) U.S. Cl.
CPC .............. *G10L 15/22* (2013.01); *G10L 15/26* (2013.01); *G06F 1/163* (2013.01); *G06F 3/011* (2013.01); *G06F 3/04847* (2013.01)

(56) References Cited

U.S. PATENT DOCUMENTS

| | | | |
|---|---|---|---|
| 2004/0027312 A1 | 2/2004 | Owada et al. | |
| 2007/0035518 A1 | 2/2007 | Francz et al. | |
| 2009/0099836 A1* | 4/2009 | Jacobsen | G06F 40/58 |
| | | | 704/3 |
| 2009/0128448 A1* | 5/2009 | Riechel | G06F 3/038 |
| | | | 345/8 |
| 2010/0309097 A1* | 12/2010 | Raviv | A63F 13/428 |
| | | | 345/8 |
| 2012/0293935 A1* | 11/2012 | Sherlock | G06F 1/1666 |
| | | | 361/679.03 |
| 2014/0071041 A1 | 3/2014 | Fujimaki | |
| 2015/0095063 A1* | 4/2015 | Sherman | G06F 3/011 |
| | | | 705/3 |
| 2015/0153765 A1* | 6/2015 | Filson | G06F 1/163 |
| | | | 361/679.03 |
| 2015/0241969 A1* | 8/2015 | Elangovan | G06F 3/017 |
| | | | 345/156 |
| 2016/0070368 A1* | 3/2016 | Hong | G06F 3/04847 |
| | | | 345/163 |
| 2016/0196693 A1* | 7/2016 | Kobayashi | G06F 3/014 |
| | | | 345/633 |
| 2017/0115839 A1* | 4/2017 | Park | G06F 3/017 |
| 2017/0230492 A1* | 8/2017 | Ishikawa | H04M 1/7253 |
| 2017/0336882 A1 | 11/2017 | Tome et al. | |
| 2019/0011981 A1* | 1/2019 | Noguchi | G06F 3/017 |
| 2019/0018567 A1 | 1/2019 | Murphy et al. | |

FOREIGN PATENT DOCUMENTS

| | | |
|---|---|---|
| CN | 108761795 A | 11/2018 |
| CN | 109101102 A | 12/2018 |
| CN | 110134197 A | 8/2019 |
| EP | 3 043 237 A1 | 7/2016 |
| JP | 5776919 B1 | 9/2015 |
| JP | 6264871 B2 | 1/2018 |
| KR | 10-2005-0102585 A | 10/2005 |
| KR | 10-2016-0029525 A | 3/2016 |
| RU | 2688278 C1 | 5/2019 |

OTHER PUBLICATIONS

Extended European Search Report for Application No. 19212504.5, dated May 14, 2020.
International Search Report of PCT Application No. PCT/CN2019/108639, dated Mar. 26, 2020.
Notification of Reason for Refusal dated Mar. 9, 2021, from the Korean Intellectual Property Office, in counterpart Korean Application No. 10-2019-7034600.

* cited by examiner

WEARABLE CONTROL DEVICE, VIRTUAL/AUGMENTED REALITY SYSTEM AND CONTROL METHOD

CROSS-REFERENCE TO RELATED APPLICATIONS

The present application is based upon and claims priority to Chinese Patent Application No. 201910563002.4, filed on Jun. 26, 2019, the entire content of which is incorporated herein by reference.

TECHNICAL FIELD

The present disclosure relates to the field of electronic devices, and in particular, to a wearable control device, a virtual/augmented reality system, and a control method.

BACKGROUND

Augmented Reality (AR) is a technology of increasing the perception of a user to the real world through information provided by a computer system. The AR technology applies virtual information to the real world, and superimposes virtual information (including virtual objects, scenarios, or system prompt information) generated by a computer on the real scenario, thereby realizing enhancement of the reality.

In the related art, a head-mounted audio-visual device includes three parts: a head-mounted display, an AR host computer and a wireless remote controller. The head-mounted display is used for displaying virtual information generated by the AR host computer and capturing environment information in a real environment; the AR host computer is used for calculating the virtual information and outputting it to the head-mounted display; the wireless remote controller is used for receiving control operation of the user and inputting the control operation of the user to the AR host computer, so that the AR host computer can adjust or change the generated virtual information.

In practical use, the head mounted display needs to be worn on the head of the user, the AR host computer can be worn at the belt position of the user, and the wireless remote controller is held by the user. The wireless remote controller is easy to be lost and is not beneficial to storage.

SUMMARY

According to an aspect of the present disclosure, a wearable control device for connecting with a head-mounted audio-visual device is provided. The wearable control device includes: a housing including a top housing portion and a bottom housing portion arranged in parallel, wherein a gap is formed between two opposite surfaces of the top housing portion and the bottom housing portion, and tail portions of the top housing portion and the bottom housing portion are connected through a transition portion; at least one physical remote control unit disposed on a top surface of the top housing portion; and a processor disposed inside the housing and electrically connected with the physical remote control unit.

According to another aspect of the present disclosure, a wearable control device for connecting with a head-mounted audio-visual device is provided. The wearable control device includes: a housing; at least one physical remote control unit disposed on the housing; a processor disposed inside the housing and electrically connected with the physical remote control unit; wherein the processor is configured to generate audio-visual information output by the head-mounted audio-visual device, the audio-visual information including at least one of VR audio-visual information, AR audio-visual information, or MR audio-visual information; generate a control signal of the audio-visual information according to a user operation received by the physical remote control unit; and control output of the audio-visual information according to the control signal.

According to another aspect of the present disclosure, a virtual/augmented reality system including a head-mounted audio-visual device and a wearable control device connected each other is provided. The wearable control device is a wearable control device as provided in the above aspects.

The technical solution provided by the embodiment of the present disclosure at least has the following technical effects:

By disposing the physical remote control unit on the housing of the wearable control device, a user may directly use the physical remote control unit on the housing to control the audio-visual information displayed on the wearable audio-visual device without using an independently disposed wireless remote controller, so that the problem that the wireless remote controller in the related technology is easy to be lost is solved, and portability and functionality of the wearable control device are enhanced.

BRIEF DESCRIPTION OF THE DRAWINGS

The accompanying drawings, which are incorporated in the description and form a part of the description, illustrate embodiments of the disclosure and explain the principles of the disclosure together with the description.

DETAILED DESCRIPTION

Embodiments of the present disclosure will be described in detail below with reference to the accompanying drawings. Although exemplary embodiments have been illustrated in the accompanying drawings, it should be understood that the present disclosure may be embodied in various forms and should not be construed to be limited to the embodiments set forth herein; rather, these embodiments are provided as examples.

Virtual Reality (VR), also known as a virtual environment or artificial environment, is a virtual world that is created in a three-dimensional space by computer simulation, for providing the user with a simulation of visual, auditory, tactile senses, etc., so that the user can have immersive experience and observe things in the three-dimensional space in time without restriction. When the user moves a position, the computer can immediately perform complex operation to transmit the accurate 3D world image back to generate a sense of immediacy. The scenarios and characters observed using the VR technology are all false, substituting human consciousness into a virtual world.

Augmented Reality (AR) is a method for enhancing the interaction of a user between the real world and the virtual world by superimposing the real world and the virtual world on the same screen or in the same space through computer technology.

Mixed Reality (MR) combines the advantages of the VR technology and the AR technology, and mixes the virtual world and the real world together through computer technology. Compared to AR technology, the MR technology creates a new visual environment that contains both physical entities and virtual information, allowing users to interact with the environment in real time. The relative position of the virtual object in the environment is independent of the movement position of the user, and the virtual object observed by the user can hardly be distinguished from the real object.

Figure 1:
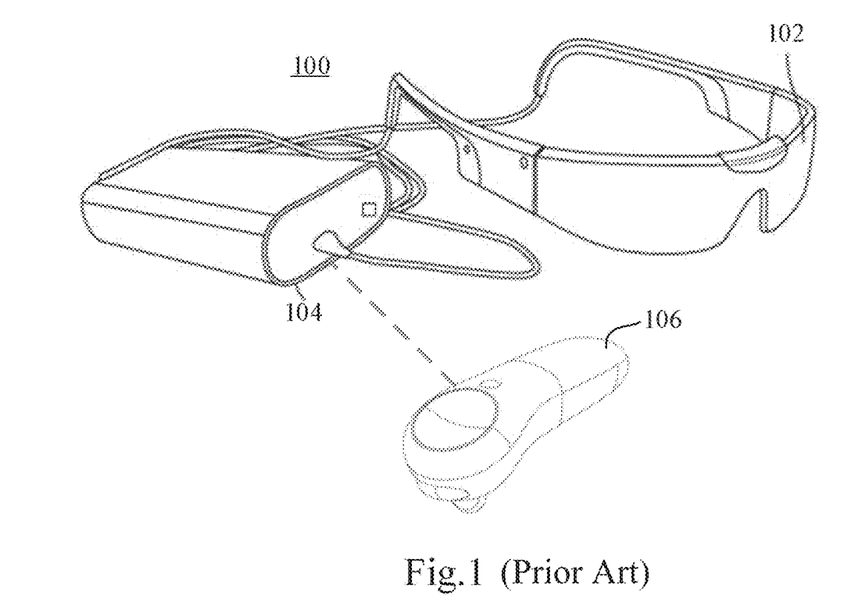
FIG. 1 is a schematic diagram of an augmented reality system in the related art.

FIG. 1 shows a schematic diagram of an AR system 100 in the related art. The augmented reality system 100 includes: a head-mounted audio-visual device 102, a wearable control device 104, and a wireless remote controller 106. The head-mounted audio-visual device 102 and the wearable control device 104 are connected by a wired connection, and the wearable control device 104 and the wireless remote controller 106 are connected by a wireless connection.

The head-mounted audio-visual device 102 is configured to display (or play, output) AR audio-visual information.

The wearable control device 104 is configured to generate AR audio-visual information and transmit the AR audio-visual information to the head-mounted audio-visual device 102. The wearable control device 104 is configured to receive the control signal reported by the wireless remote controller 106, and adjust or change the AR audio-visual information according to the control signal.

The wireless remote control 106 is configured to receive user operations, generate control signals according to the user operations, and report the control signals to the head-mounted audio-visual device 102 via a wireless connection.

In use, the user wears the head mounted audio-visual device 102 on the head and the wearable control device 104 on the waist, and holds the wireless remote control 106 by hand. The wearable control device 104 may generate AR audio-visual information for transmission to the head-mounted audio-visual device 102, which outputs (or plays) the AR audio-visual information. When the user needs to control the display of the head-mounted audio-visual device 102, the wireless remote controller 106 is used for control.

Since the usage scenario of the AR is a scenario combined with the real world, the requirement for portability of the system 100 is high, and when the user walks around in different real scenarios, the wireless remote controller 106 is easy to be lost.

An embodiment of the present disclosure provides a wearable control device, which integrates a wireless remote controller into the wearable control device, so that a user can control the head-mounted audio-visual device without separately carrying the wireless remote controller.

Figure 2:
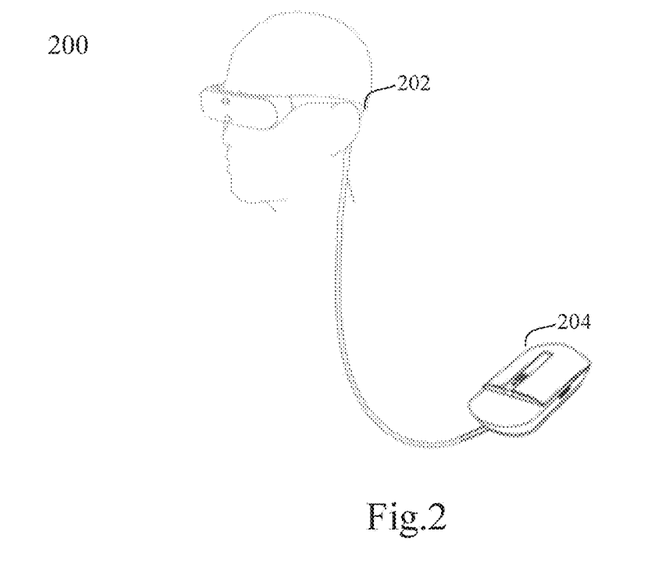
FIG. 2 is a schematic diagram of an augmented reality system according to an exemplary embodiment.

FIG. 2 shows a schematic diagram of a virtual/augmented reality system 200 according to an exemplary embodiment of the present disclosure. The system 200 includes: a head-mounted audio-visual device 202 and a wearable control device 204. The head-mounted audio-visual device 202 and the wearable control device 204 are connected by a wired connection or a wireless connection.

The head-mounted audio-visual device 202 is configured to output (or play) audio-visual information including at least one of VR audio-visual information, AR audio-visual information, or MR audio-visual information. The VR audio-visual information is audio-visual information used to present a full virtual three-dimensional world. The AR audio-visual information is audio-visual information used to present virtual elements superimposed-displayed on the real world. The virtual element is at least one of a virtual character, a virtual cartoon character, a virtual animal, a virtual plant, a virtual non-living object, a virtual menu, a virtual diagram and a virtual image.

The wearable control device 204 is configured to generate audio-visual information output (or played) by the head-mounted audio-visual device 202 and transmit the audio-visual information to the head-mounted audio-visual device 202. At least one physical remote unit is provided on the housing of the wearable control device 204, and the wearable control device 204 is further configured to generate a control signal of the audio-visual information according to a user operation received by the physical remote control unit, and to control output of the audio-visual information according to the control signal.

Figure 3:
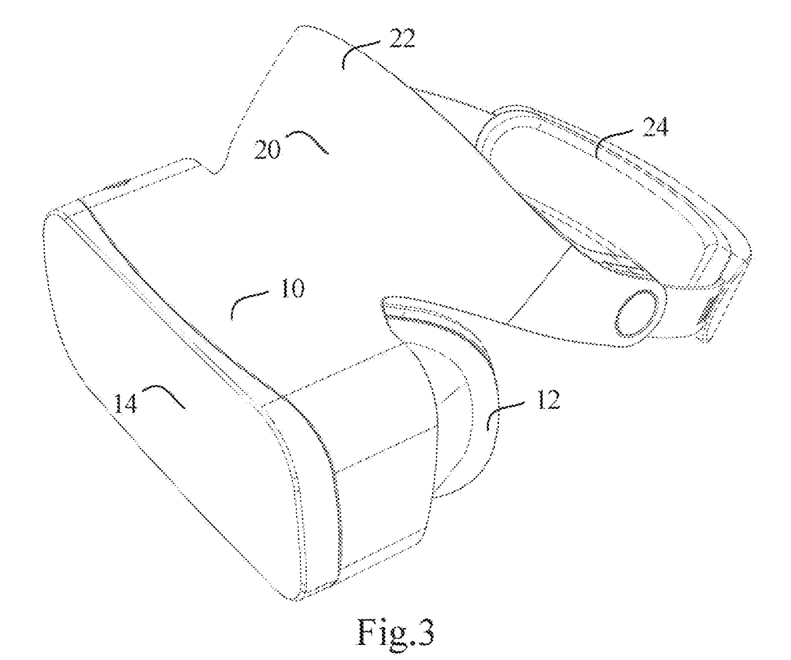
FIG. 3 is a schematic diagram of a VR-type head-mounted audio-visual device according to an exemplary embodiment.

In an embodiment based on FIG. 2, the head-mounted audio-visual device 202 is a glasses device for outputting (or playing) VR audio-visual information. FIG. 3 is a schematic diagram of the head-mounted audio-visual device 202 (FIG. 2) according to an exemplary embodiment. The head-mounted audio-visual device 202 includes a glasses body 10 and a wearing structure 20 for fixing the glasses body 10 to the face of a user.

The glasses body 10 includes a first surface 12 and a second surface 14. The first surface 12 faces and fits the face of the user, and a display screen is disposed inside the housing corresponding to the second surface 14. In some embodiments, the display screen may include a left display screen corresponding to a left eye and a right display screen corresponding to a right eye. The display screen is used for outputting (or playing) video information in the VR audio-visual information.

The wearing structure 20 includes a fixed connection portion 22 and a wearing adjustment portion 24.

The bottom of the fixed connection portion 22 is fixedly connected with the top of the glasses body 10, and the fixed connection portion 22 and the wearing adjustment portion 24 are both arc-shaped and enclose an annular structure matched with the head of the user, so that the user can wear the glasses device. The wearing adjustment portion 24 is used for adjusting the specification of the annular structure, so that the wearing structure 20 can be adapted to sizes of heads of different users.

In an embodiment, a connection interface (not shown in FIG. 2) is further provided on the glasses body 10, and the glasses body 10 is connected with the wearable control device 204 via the connection wire through the connection interface.

In some embodiments, the fixed connection portion 22 is further provided with an earphone for playing the audio information in the VR audio-visual information.

Figure 4:
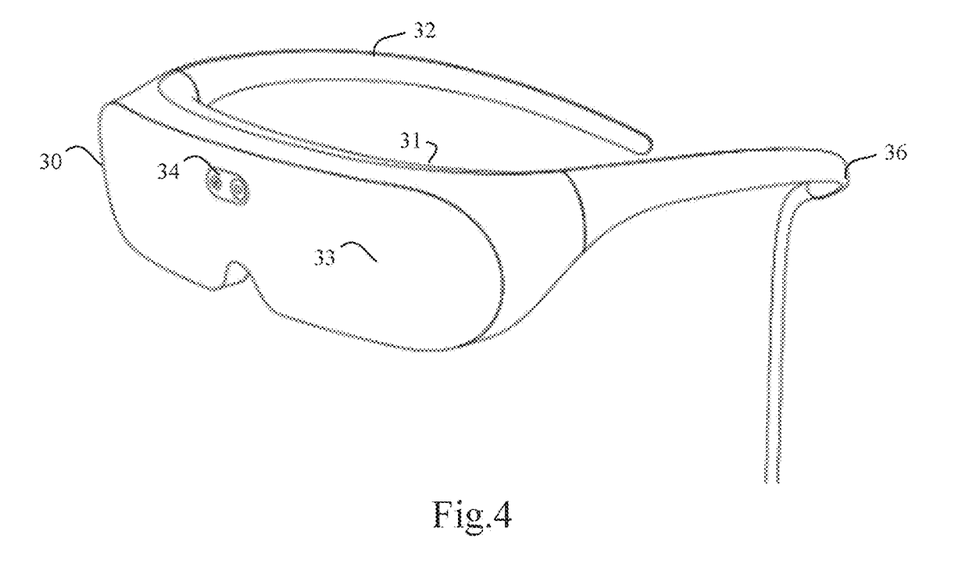
FIG. 4 is a schematic diagram of an AR-type head-mounted audio-visual device according to an exemplary embodiment.

In an embodiment based on FIG. 2, the head-mounted audio-visual device 202 is a glasses device for outputting (or playing) AR audio-visual information. FIG. 4 is a schematic diagram of the head-mounted audio-visual device 202 (FIG. 2) according to an exemplary embodiment. The head-mounted audio-visual device 202 includes a glasses body 30 and two temples 32.

The glasses body 30 includes a first surface 31 and a second surface 33. The first surface 31 faces and fits the face of the user, the second surface 33 faces a side away from the face of the user, and the second surface 33 is provided with two camera modules 34. The two camera modules 34 are spaced apart from each other by a distance, for example, 1 cm or 2 cm. In an embodiment, the two camera modules 34 are used for acquiring an environment picture and an object distance in a real environment.

In an embodiment, the first surface 31 is provided with a display screen on each of two regions facing eyes of the user. The display screen may include a left display screen corresponding to a left eye and a right display screen corresponding to a right eye. The display screen is used for playing the environment picture of the real environment acquired by two camera modules 34 and the video information in the AR audio-visual information.

In another embodiment, the first surface 31 is provided with a transparent lens on each of two regions facing the eyes of the user. Meanwhile, projection parts (not shown in FIG. 3) facing the transparent lenses are provided on two temples 32, and the projection part is used for projecting video information in the AR audio-visual information to the transparent lenses and then superimposing with the environment picture of the real environment observed by the user through the transparent lenses.

With respect to the MR-type head-mounted audio-visual device, reference may be made to the AR-type head-mounted audio-visual device illustrated in FIG. 4, and those skilled in the art can obtain the MR-type head-mounted audio-visual device based on the AR-type head-mounted audio-visual device.

Figure 5:
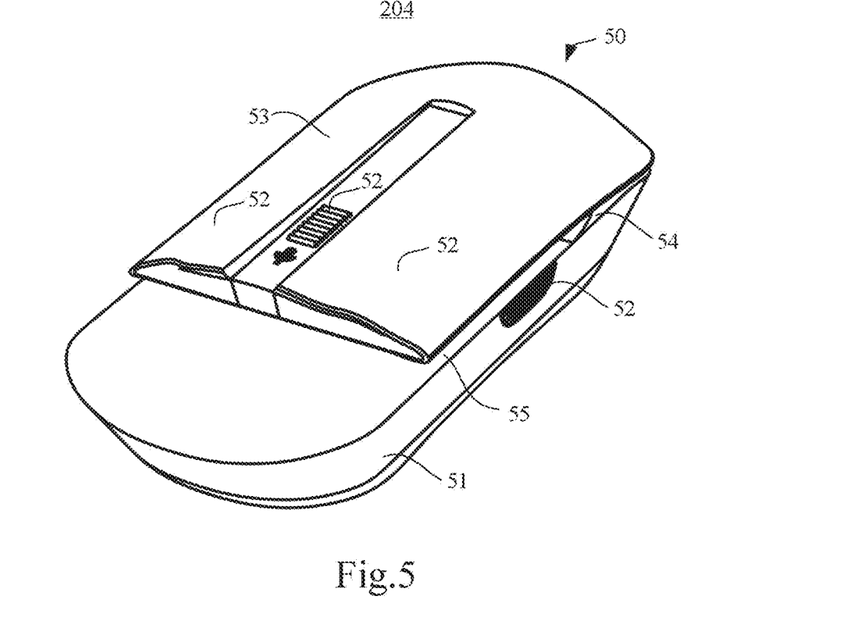
FIG. 5 is a perspective view of a wearable control device according to an exemplary embodiment.

FIG. 5 is a perspective view of the wearable control device 204 (FIG. 2) according to an exemplary embodiment. The wearable control device 204 includes: a housing 50, at least one physical remote control unit 52 disposed on the housing 50 and a computing module (not shown), such as a processor, disposed inside the housing 50, wherein the computing module is electrically connected with the physical remote control unit 52.

The computing module configured to generate audio-visual information output (or played) on the head-mounted audio-visual device 202, the audio-visual information including at least one of VR audio-visual information, AR audio-visual information, or MR audio-visual information; generate a control signal of audio-visual information based on a user operation received by the physical remote control unit 52; and control output of the audio-visual information according to the control signal.

In an embodiment, the housing 50 is a U-shaped housing. One end of the U-shaped housing forms a bottom housing portion 51, the other end of the U-shaped housing forms a top housing portion 53, and the curved portion of U-shaped housing forms a transition portion 54.

There is at least one physical remote control unit 52 disposed on the top surface of the top housing portion. A gap 55 is formed between opposite surfaces of the bottom housing portion 51 and the top housing portion 53.

In an embodiment, the physical remote control unit 52 includes at least one of a physical key, a virtual key, a roller, a rocker and a track ball. The present embodiment does not limit the arrangement position of the physical remote control unit 52 on the top surface of the top housing portion 53, and does not limit the type and number of the physical remote control unit 52.

In the above-described wearable control device, the physical remote control unit is disposed on the housing of the wearable control device, so that the user can directly use the physical remote control unit on the housing to control the audio-visual information displayed on the head-mounted audio-visual device without a separately disposed wireless remote controller, thereby solving the problem that the wireless remote controller in the related art is easy to be lost, and enhancing the portability and functionality of the wearable control device.

FIGS. 6 to 11 show six-sided views of the wearable control device 204 (FIG. 2) according to exemplary embodiments. The wearable control device 204 is used to connect with the head-mounted audio-visual device 202. Referring to FIGS. 6 to 11, the wearable control device 204 includes the top housing portion 53 and the bottom housing portion 51 arranged in parallel, with the gap 55 formed between two opposite surfaces of the top housing portion 53 and the bottom housing portion 51. Tail portions of the top housing portion 53 and the bottom housing portion 51 are connected through the transition portion 54.

The top housing portion 53 is a housing portion provided with the physical remote control units 52. The top housing portion 53 has a long flat shape. The top housing portion 53 includes a tail portion close to the transition portion 54 and a top portion away from the transition portion 54. The top housing portion 53 includes a top surface, two side surfaces, and a surface facing the bottom housing portion 51. At least one physical remote control unit 52 is disposed on a top surface of the top housing portion 53.

A first pressing portion 521 and a second pressing portion 522 are arranged in parallel on the edge region on the top surface of the top housing portion 53. The edge region is a localized region of the top surface away from the transition portion 54. The first pressing portion 521 may be referred to as a left key, and the second pressing portion 522 may be referred to as a right key. In an embodiment, the housing corresponding to the first pressing portion 521 has elasticity, and a first micro switch is disposed below the first pressing portion 521, wherein when the first pressing portion 521 is pressed, the first micro switch is also triggered to generate an electrical signal; the housing corresponding to the second pressing portion 522 has elasticity, and a second micro switch is disposed below the second pressing portion 522, wherein when the second pressing portion 522 is pressed, the second micro switch is also triggered to generate an electrical signal.

There is an interval region between the first pressing portion 521 and the second pressing portion 522. The physical remote control unit 52 further includes a first key 523 and a roller 524 disposed between the first pressing portion 521 and the second pressing portion 522. A second key 525 is also provided on a side surface of the bottom housing portion 51.

The first key 523 and the second key 525 are implemented by micro switches or virtual keys. The roller 524 may be implemented using a physical roller or a virtual roller.

The bottom housing portion 51 has a long flat shape. The bottom housing portion 51 includes a tail portion close to the transition portion 54 and a top portion away from the transition portion 54. The bottom housing portion 51 includes a bottom surface, two side surfaces and a surface facing the top housing portion 53.

A computing module (not shown) corresponding to the head-mounted audio-visual device 202 is provided inside the top housing portion 53 and/or the bottom housing portion 51, and the computing module is electrically connected with each of the physical remote control units 52.

The computing module includes a processor and a memory. The computing module may be implemented as one chip or a plurality of chips. When the computing module is implemented as multiple chips, functions of any two chips may be the same or different. There are some chips that may be disposed in the top housing portion 53 and there are other chips that may be disposed in the bottom housing portion 51. A battery is also provided in at least one of the top housing portion 53 and the bottom housing portion 51.

The transition portion 54 is provided with a connecting wire for connecting with the head-mounted audio-visual device 202. A length of the top housing portion 53 is shorter than a length of the bottom housing portion 51. The length of the top housing portion 53 is a top-to-bottom distance of the top housing portion 53, and the length of the bottom housing portion 51 is a top-to-bottom distance of the bottom housing portion 51.

The operation of physical remote control units 52 includes at least one of the following manners.

In a first manner, when the user operation is received by the first pressing portion 521, the computing module generates at least one of a confirmation signal, a drag control signal, and a multiple-choice control signal matched with the audio-visual information.

The first pressing portion 521 may be referred to as a "left key" or a "enter key", and the user operation includes at least one of a single-click operation, a double-click operation, and a long-press signal.

The confirmation signal refers to a signal that confirms a meaning or a class-confirming meaning. For example, the confirmation signal may indicate confirmation, approval, permission, next step and the like. The name or meaning of the confirmation signal may vary slightly depending on the audio-visual information, and the embodiment of the present application does not limit the variation. The drag control signal may be a drag control operation on the target object, for example, dragging the target object from one location to another, wherein a start location and a target location of the dragging operation are not limited herein. The multiple-choice control signal may be a control operation for selecting a plurality of target objects, and the controlled object and the selection number of the multiple-choice control signal are not limited herein.

In an embodiment, when the single-click operation is received on the first pressing portion 521, the computing module generates a click confirmation signal matched with the audio-visual information; when the long-press operation is received on the first pressing portion 521, the computing module generates a drag control signal or a multiple-choice control signal matched with the audio-visual information.

In a second manner, when the user operation is received by the second pressing portion 522, the computing module generates an auxiliary menu control signal matched with the audio-visual information.

The second pressing portion 522 may be referred to as a "right key" or a "menu key", and the auxiliary menu control signal refers to an auxiliary menu associated with the audio-visual information. The content of the auxiliary menu control signal may vary slightly according to the audio-visual information, and the embodiment of the present application does not limit the variation. In an embodiment, the auxiliary menu control signal includes at least one of a viewing mode menu, an arrangement mode menu, a new content menu, a setup menu, a cut option, a copy option, a paste option, a volume adjustment menu, a brightness adjustment menu, a field of view adjustment menu, and a numerical value adjustment menu.

In an embodiment, the audio-visual information shows a shark that is moving in a real scenario and is displayed in a superimposed manner, and when a single-click operation is received by the second pressing portion 522, the auxiliary menu is popped up. The auxiliary menu has a copy option, and the user may click the copy option to display another moving shark in a superimposed manner in a real scenario.

In a third manner, when the user operation is received by the first key 523, the computing module receives a voice signal, and generates a voice control signal according to the voice signal, or converts the voice signal into a text input.

The first key 523 may be referred to as a "voice activation key", and the user operation includes a long-press operation or a double-click operation.

When the long-press operation is received by the first key 523, the computing module performs voice recognition in the process of pressing the first key 523, receives a voice signal acquired by a microphone, and obtains a voice control signal according to the voice signal recognition. In an embodiment, the microphone is provided in the wearable control device, or the microphone is provided in the head-mounted audio-visual device, or is a third-party microphone device.

In an embodiment, when the double-click operation is received by the first key 523, the computing module starts a voice-to-text service, and converts a voice signal acquired by the microphone into text input by using the voice-to-text service.

In an embodiment, when the long-press operation is received, the voice signal is converted into the text input, and when the double-click operation is received, the voice signal is acquired and recognized to obtain the voice control signal, which is not limited herein.

In a fourth manner, when the user operation is received by the roller 524, a numerical value adjustment instruction is generated. The numerical value adjustment instruction is an instruction for adjusting an arbitrary numerical value associated with the audio-visual information. The numerical value adjustment instruction includes at least one of the following instructions: a volume adjustment instruction, a brightness adjustment instruction, a visual field size adjustment instruction, a scenario size adjustment instruction, a visual angle rotation instruction, a visual angle distance adjustment instruction, or an Internet of things device adjustment instruction.

The roller 524 is a mechanical roller or a virtual key roller. In an embodiment, the roller 524 is a bi-directional roller or a four-directional roller. When the user operation is received by the roller 524, a numerical value adjustment instruction matched with the audio-visual information is generated. The audio-visual information includes audio information and visual information.

In an embodiment, the user operation operates a scrolling or sliding operation on the roller 524.

In an embodiment, the volume adjustment instruction is an instruction for turning up or down the volume of the audio information. The brightness adjustment instruction is an instruction for adjusting the brightness of the visual information to be higher or lower. The visual field size adjustment instruction is an instruction for adjusting the visual field in the visual information to be larger or smaller. The scenario size adjustment instruction is an instruction for adjusting the size of an environmental scenario (or a virtual object) in the visual information to be larger or smaller. The visual angle rotation instruction is an instruction for rotating a virtual visual angle in the visual information, and the rotation includes at least one of upward, downward, leftward, and rightward rotations. The visual angle distance adjustment instruction is an instruction for adjusting the virtual visual angle in the visual information to be further or nearer. The Internet of things device adjustment instruction is an instruction for adjusting working parameters of binding Internet of things device (such as intelligent household device).

In a fifth manner, when the user operation is received by the second key 525, the computing module generates at least one control signal of a return signal, a previous page signal, or a screen capture signal.

The second key 525 is also referred to as a "power key", and the return signal is a signal for returning to the home page or the upper menu. The previous page signal is a signal for returning to the previous page of the current page when there are a plurality of pages. The screen capture signal is a signal for capturing the currently displayed audio-visual information.

In an embodiment, when a single-click operation is received on the second key 525, the computing module generates at least one control signal of a return signal, a previous page signal, or a screen capture signal matched with the audio-visual information.

In a sixth manner, when the user operation is received by the second key 525, the computing module generates at least one control signal of a turn-on signal, a turn-off signal, a restart signal and a power-off signal.

The turn-on signal is a signal for turning on the wearable control device (or the wearable device and the head-mounted audio-visual device), the turn-off signal is a signal for turning off the wearable control device (or the wearable device and the head-mounted audio-visual device), and a restart signal is a signal for restarting the wearable control device (or the wearable device and the head-mounted audio-visual device).

In an embodiment, when the first long-press operation is received by the second key 525 (for example, pressing for 2 seconds), if the wearable control device is in a turn-on state, the computing module generates a turn-off signal or a restart signal; and if the wearable control device is in a turn-off state, the computing module generates a turn-on signal.

When the second long-press operation (for example, for 6 seconds) is received by the second key 525, if the wearable control device is in the turn-on state, the computing module generates a power-off signal.

The user may also use the above-described keys to implement different functions, for example, press two keys or press the pressing portion simultaneously to trigger a preset function, which is not limited in this embodiment. In some embodiments, functions of the physical remote control units support user customization, and the user can define a function or shortcut corresponding to each physical remote control unit.

In an embodiment, when the head-mounted audio-visual device is connected with the wearable control device, the user receives a message prompt displayed on the head-mounted audio-visual device, wherein this message display the name and model of the head-mounted audio-visual device to prompt the user to confirm whether the head-mounted audio-visual device is connected with the wearable control device. At this time, the user can make a corresponding selection according to actual conditions, and if the name and model of the head-mounted audio-visual device are consistent with those displayed by the message, the user can press the first pressing portion 51 on the wearable control device (i.e., single-click the left key), and select the "OK" virtual key on the message prompt, so as to trigger the computing module to generate a confirmation instruction, and complete the confirmation process of the connection of the head-mounted audio-visual device.

In an embodiment, when the user manages the content displayed by the worn head-mounted audio-visual device, for example, when the user puts the viewed photo into a new folder, the user drags the selected photo by continuously pressing the first pressing portion 521 (i.e., long-pressing the left key), so that the selected photo is put into the new folder. For another example, when the user needs to delete photos in batches, the user selects photos to be deleted by pressing the left key 301 for a long time and drags the photos into a recycle bin, i.e., the batch deletion of the selected photos is realized.

In an embodiment, the second pressing portion 522 is configured to trigger the computing module to generate an auxiliary menu generation instruction to call out an auxiliary menu in response to receiving the long-press signal. As an example, when the user modifies an attribute parameter of the wearable control device, for example, when the user continuously presses the second pressing portion 522 (i.e., long-presses the right key), the auxiliary menu may be popped up on the display interface of the head-mounted audio-visual device.

In an embodiment, when the user changes the icon of the application program displayed on the head-mounted audio-visual device, the second pressing portion 522 is continuously pressed (i.e. pressed the right key for a long time) to trigger the main control circuit to generate an auxiliary menu instruction, and the auxiliary menu appears on the head-mounted audio-visual device, and the "changing icon" virtual key is selected, i.e., changing the icon of the application program displayed on the head-mounted audio-visual device. It should be noted that the auxiliary menu may include a plurality of shortcut options, and each shortcut option may trigger the computing module to generate a shortcut instruction to control the optical display device to perform a shortcut operation. For example, when the user changes the size of the text displayed on the head-mounted audio-visual device, the right key is pressed for a long time to trigger the main control circuit to generate an auxiliary menu instruction. Then, the auxiliary menu appears on the head-mounted audio-visual device, a shortcut option "setting the size of the text" appears on the auxiliary menu, and the shortcut option "setting text size" is selected, so that the size of the text is changed. The shortcut options included in the auxiliary menu simplify the operation steps for the user to change some parameters of the head-mounted audio-visual device, and are convenient for the user to use. In an embodiment, the shortcut options included in the auxiliary menu may be changed according to the usage habits of the user. For example, the shortcut options may be set as personalized settings such as "changing icon", "setting text size", and the like, and may also be set as functional settings such as "adding backlog", "checking mail", and the like.

In an embodiment, the physical remote control unit 52 may include the first key 523 disposed between the first pressing portion 521 and the second pressing portion 522.

In an embodiment, the first key 523 is configured to trigger the computing module to generate a voice recognition instruction to recognize voice data when a pressing signal is received; trigger the computing module to generate a closing instruction when a lifting signal is received, so as to close the voice recognition function; and triggering the computing module to generate a conversion instruction when the double-click signal is received, so as to convert the voice recognition function into the text input function.

For example, in a case where a user uses a voice chat function to chat with a chat object, when the user needs to chat by sending a message in a voice form to the chat object, the first key 523 disposed between the first pressing portion 521 and the second pressing portion 522 is pressed, and when a pressing signal is received by the first key 523, the computing module is triggered to generate a voice recognition instruction, so as to recognize voice data and generate the message in a voice form; when the user finishes the content to be expressed, the first key 523 is released, and when a lifting signal is received by the first key 523, the computing module is triggered to generate a closing instruction to close the voice data recognition, and the generated message in the voice form is sent to the chat object; when the chat object is in an environment where it is inconvenient to send voice, for example, when the user is chatting with the chat object in a quiet library, the user double-clicks the first key 523, and the voice recognition activation key 523 receives the double-click signal, and triggers the computing module to generate a conversion instruction, so that the voice recognition function is converted into the text input function, and the user may chat with the chat object in a manner of text input.

As another example, the first key 523 may also convert the recognized voice into a message in the text form to be sent. When the user cannot input the text and the chat object is not convenient to check the received voice message, for example, the chat object is in a theater, the user may double-click the first key 523 at this time to select the function of converting the voice into the text input, so that the recognized voice may be converted into the text message.

Figure 6:
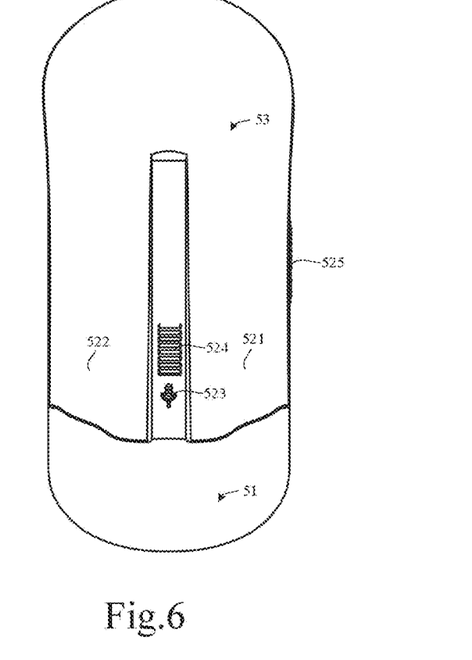
FIG. 6 is a front view of a wearable control device according to an exemplary embodiment.
Figure 7:
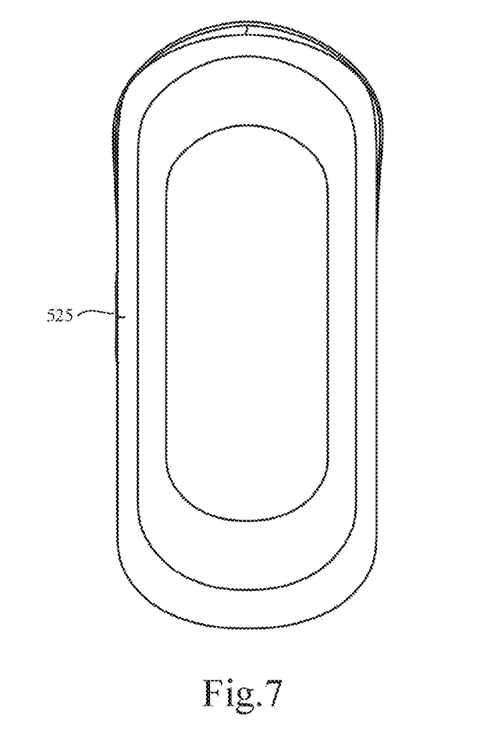
FIG. 7 is a rear view of a wearable control device according to an exemplary embodiment.
Figure 8:
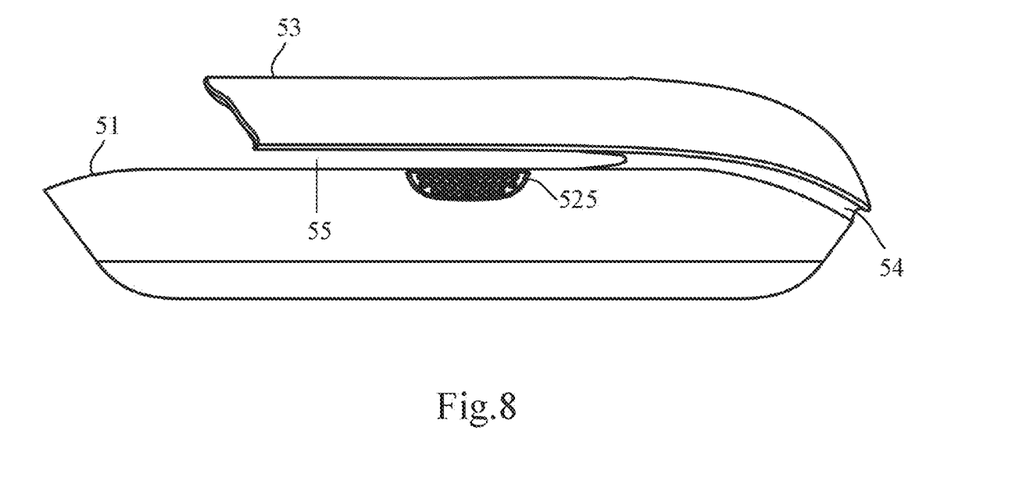
FIG. 8 is a left side view of a wearable control device according to an exemplary embodiment.
Figure 9:
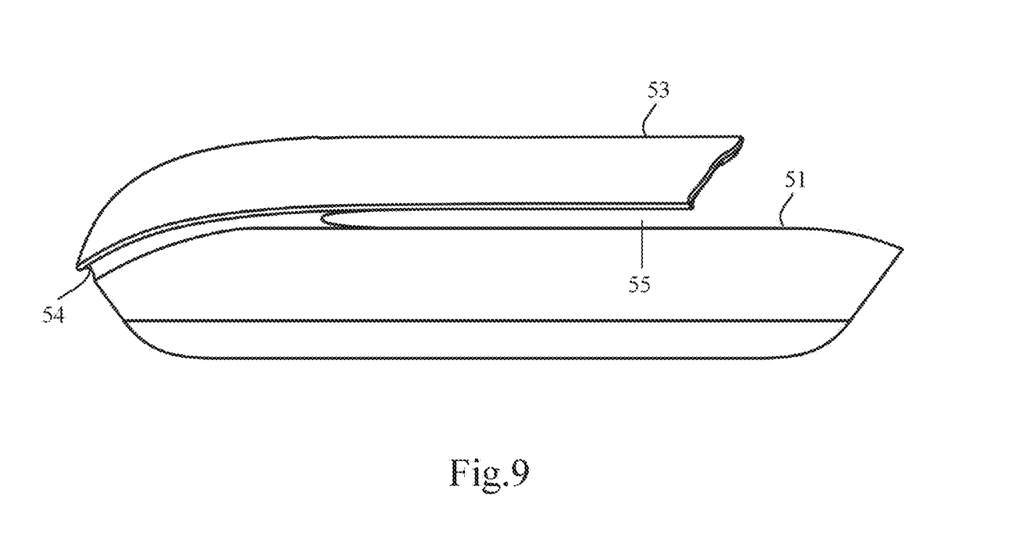
FIG. 9 is a right side view of a wearable control device according to an exemplary embodiment.
Figure 10:
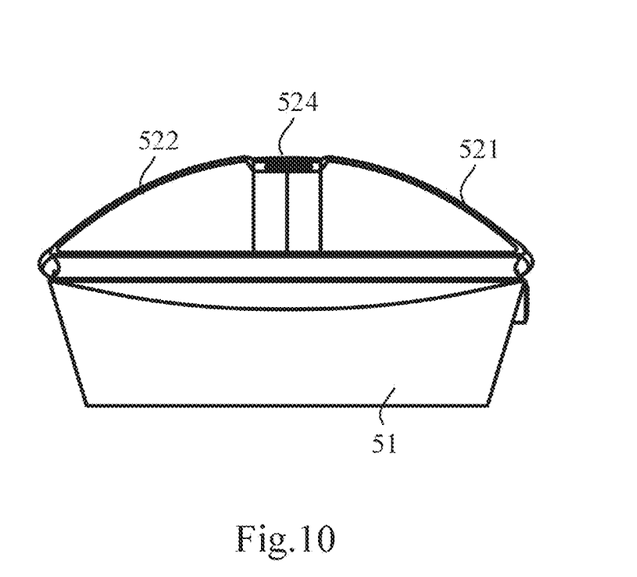
FIG. 10 is a bottom view of a wearable control device according to an exemplary embodiment.
Figure 11:
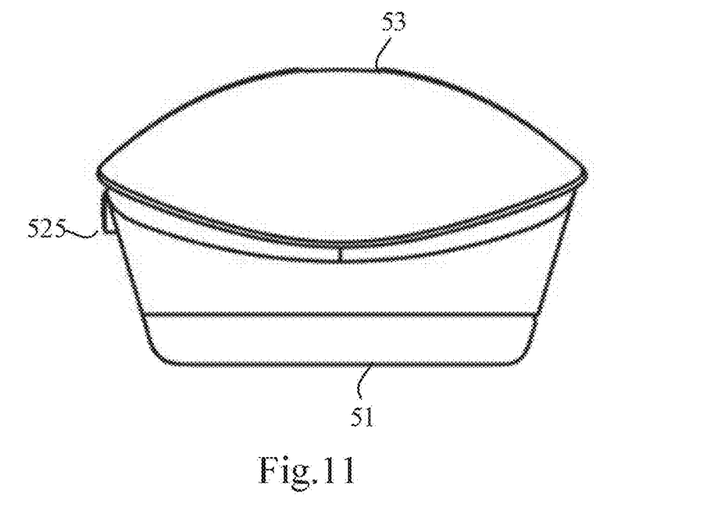
FIG. 11 is a top view of a wearable control device according to an exemplary embodiment.

In an embodiment, the physical remote control unit 52 may include the roller 524 disposed between the first pressing portion 521 and the second pressing portion 522, as shown in FIG. 6. In an embodiment, the roller 524 is configured to trigger the computing module to generate an adjustment instruction to adjust various parameters of the head-mounted audio-visual device when a scroll signal is received. In an embodiment, the roller 524 may be slide in an upward direction (i.e., a direction toward the first key 523) or may be slide in a downward direction (i.e., a direction away from the first key 523).

As an example, the roller 524 is used for adjusting the brightness of the content displayed on the head-mounted audio-visual device. When the brightness of the display screen of the head-mounted audio-visual device is too low, the roller 524 slides in the upward direction (i.e., the direction toward the first key 523), and when the scroll signal is received by the roller 524, the computing module is triggered to generate the display brightness adjustment instruction, so that the brightness of the display screen of the head-mounted audio-visual device is improved. As another example, when the user watches the video by using the head-mounted audio-visual device, the sound of the video is too loud, the roller 524 slides towards the lower side (i.e. the direction away from the first key 523), and when the scroll signal is received by the roller 524, the computing module is triggered to generate the volume adjustment instruction, so that the volume of the video played on the head-mounted audio-visual device is reduced.

In an embodiment, the physical control unit 52 may include the second key 525 disposed at an edge of a surface of the bottom housing portion 51, as shown in FIG. 6. The second key 525 is configured to trigger the computing module to generate the turn-on/off instruction when the long-press signal is received, so as to control the turn-on/turn-off of the wearable control device.

As an example, when the wearable control device is not used, the second key 525 disposed on the edge of the surface of the bottom housing 51 is continuously pressed (i.e., by pressing multi-function physical key for a long time), and the computing module is triggered to generate a turn-off instruction when a long-press signal is received by the second key 525, so that the wearable control device enters a turn-off state. When the wearable control device needs to be activated, the second key 525 disposed on the edge of the surface of the bottom housing portion 51 is pressed for a long time, and the computing module is triggered to generate a turn-on instruction when the long-press signal is received by the second key 525, so as to activate the wearable control device, i.e., the wearable control device enters a turn-on state.

In some embodiments, the second key 525 is further configured to trigger the computing module to generate a return instruction when a click signal is received, so as to control the optical display device to return to a previous page or return to a previous operation.

For example, the head-mounted audio-visual device is used to browse a web page. When the head-mounted audio-visual device connected with the wearable control device is used to browse the current web page, it may be needed to check the content of the previous page of the web page currently displayed on the head-mounted audio-visual device, and the second key 525 may be pressed or clicked to trigger the computing module to generate a return instruction, so as to control the web page currently displayed on the head-mounted audio-visual device to be returned to the previous page. It should be understood that the return instruction generated by the computing module is triggered when the click signal is received by the second key 525 may also be used to perform an operation for returning to other application program interfaces. For example, when a video is viewed online by using a head-mounted audio-visual device connected with the wearable control device, it may be needed to search for other viewable videos in the homepage of the playing video application program, and the second key 525 may be pressed or clicked to trigger the computing module to generate the return instruction, so as to control the currently displayed content of the head-mounted audio-visual device to change, i.e., return to the homepage of the video application program from the current video playing interface.

In some embodiments, a gap is formed between the bottom housing portion and the top housing portion. In an embodiment, a gap is used to secure the wearable control device described above to a user's clothing.

Figure 12:
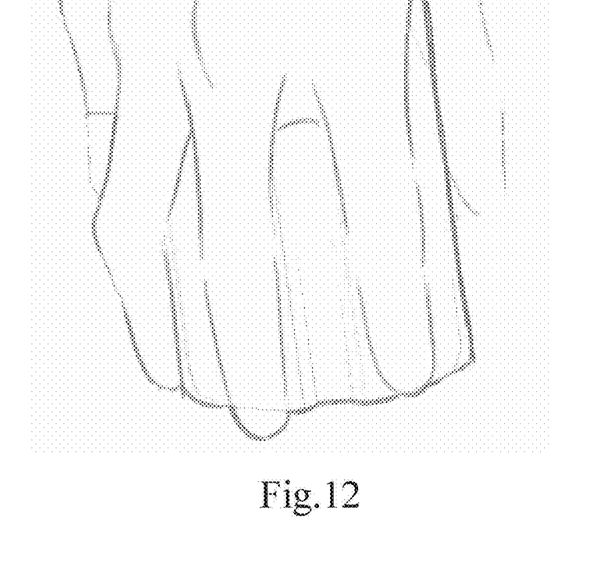
FIG. 12 is a state reference view of a wearable control device in use according to an exemplary embodiment.

As an example, when the wearable control device is used, the edge of the pocket of the user's clothes may be clamped by the gap formed between the bottom housing portion and the top housing portion of the wearable control device, as shown in FIG. 12, so that the wearable control device is convenient for the user to carry, and the wearable control device is easy to be stored. Compared to other head-mounted audio-visual device with more components, combining the control unit and the computing module can reduce the need to separately set a wireless remote controller, avoiding the need for the user to separately place the wireless remote controller, and the problem that the wireless remote control is easy to be lost.

Figure 13:
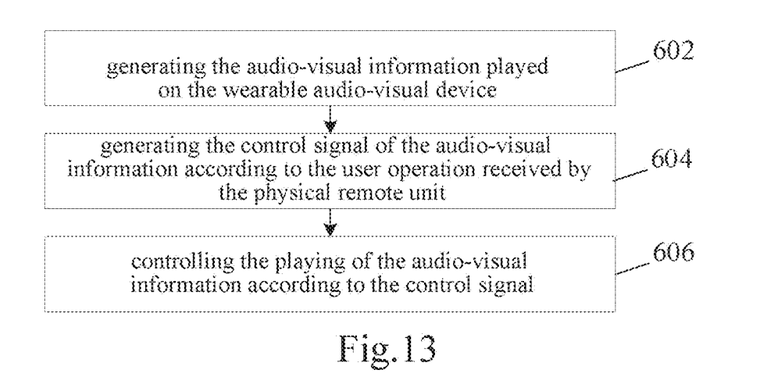
FIG. 13 is a flowchart of a control method of a wearable control device according to an exemplary embodiment.

FIG. 13 is a flowchart illustrating a control method of a wearable control device according to an exemplary embodiment. The method may be applied to a wearable device as described above, and the wearable device is electrically connected with a head-mounted audio-visual device.

The method includes step 602: generating audio-visual information output by the head-mounted audio-visual device, wherein the audio-visual information includes at least one of VR audio-visual information, AR audio-visual information, or MR audio-visual information.

In an embodiment, the wearable control device generates VR audio-visual information and AR audio-visual information which are output (or played) on the head-mounted audio-visual device, and a combination thereof, depending on the type or performance of the head-mounted audio-visual device.

For example, the head-mounted audio-visual device only supports VR audio-visual information, and the wearable control device generates the VR audio-visual information. Also for example, the head-mounted audio-visual device only supports AR audio-visual information, and the wearable control device generates the AR audio-visual information. As another example, the head-mounted audio-visual device supports both VR audio-visual information and AR audio-visual information, and the wearable control device generates the VR audio-visual information or the AR audio-visual information according to the current working mode of the head-mounted audio-visual device.

The method also includes step 604: generating a control signal of the audio-visual information according to user operation received by the physical remote control unit.

In an embodiment, the physical remote control unit includes a first pressing portion and a second pressing portion arranged in parallel on an edge region of a top surface of the top housing portion. Accordingly, the step 604 includes: generating at least one of a confirmation signal, a drag control signal, or a multiple-choice control signal matched with the audio-visual information when the user operation is received by the first pressing portion; and generating an auxiliary menu control signal matching the audio-visual information when the user operation is received by the second pressing portion.

In an embodiment, the physical remote control unit further includes a first key disposed between the first pressing portion and the second pressing portion. Accordingly, the step 604 includes: receiving a voice signal when the user operation is received by the first key, and generating a voice control signal according to the voice signal, or converting the voice signal into text input.

In an embodiment, the physical remote control unit further includes a roller disposed between the first pressing portion and the second pressing portion. Accordingly, the step 604 includes: generating a numerical value adjustment instruction when the user operation is received by the roller; wherein the numerical value adjustment instruction includes at least one of the following instructions: a volume adjustment instruction, a brightness adjustment instruction, a visual field size adjustment instruction, a scenario size adjustment instruction, a visual angle rotation instruction, a visual angle distance adjustment instruction, or an Internet of things device adjustment instruction.

In an embodiment, the physical remote control unit further includes a second key provided on a side surface of the bottom housing portion. Accordingly, the step 604 includes: generating at least one control signal of a return signal, a previous page signal, or a screen capture signal when the user operation is received by the second key; and/or generating at least one control signal of a turn-on signal, a turn-off signal, a restart signal and a power-off signal when the user operation is received by the second key.

The method further includes step 606: controlling output of the audio-visual information according to the control signal.

In the method provided by the present embodiment, by providing the physical remote control unit on the housing of the wearable control device, the user can directly use the physical remote control unit on the housing to control the audio-visual information displayed on the head-mounted audio-visual device without a separately disposed wireless remote controller, thereby solving the problem that the wireless remote controller in the related art is easily lost, and enhancing the portability and functionality of the wearable control device.

In another embodiment of the present disclosure, a wearable control device is provided, as described above. The wearable control device is configured to connect with a head-mounted audio-visual device. The wearable control device includes a processor, and a memory for storing instructions executable by the processor; wherein the processor is configured for: generating audio-visual information output by the head-mounted audio-visual device, wherein the audio-visual information includes at least one of VR audio-visual information, AR audio-visual information, or MR audio-visual information; generating a control signal of the audio-visual information according to user operation received by the physical remote control unit; and controlling output of the audio-visual information according to the control signal.

In an embodiment, the processor is configured for: generating at least one of a confirmation signal, a drag control signal, or a multiple-choice control signal matched with the audio-visual information when the user operation is received by the first pressing portion; and generating an auxiliary menu control signal matched with the audio-visual information when the user operation is received by the second pressing portion.

In an embodiment, the processor is configured for: receiving a voice signal when the user operation is received by the first key, and generating a voice control signal according to the voice signal, or converting the voice signal into text input.

In an embodiment, the processor is configured for: generating a numerical value adjustment instruction when the user operation is received by the roller; wherein the numerical value adjustment instruction includes at least one of the following instructions: a volume adjustment instruction, a brightness adjustment instruction, a visual field size adjustment instruction, a scenario size adjustment instruction, a visual angle rotation instruction, a visual angle distance adjustment instruction, or an Internet of things device adjustment instruction.

In an embodiment, the processor is configured for: generating at least one control signal of a return signal, a previous page signal or a screen capture signal when the user operation is received by the second key; and/or generating at least one control signal of a turn-on signal, a turn-off signal, a restart signal and a power-off signal when the user operation is received by the second key.

Figure 14:
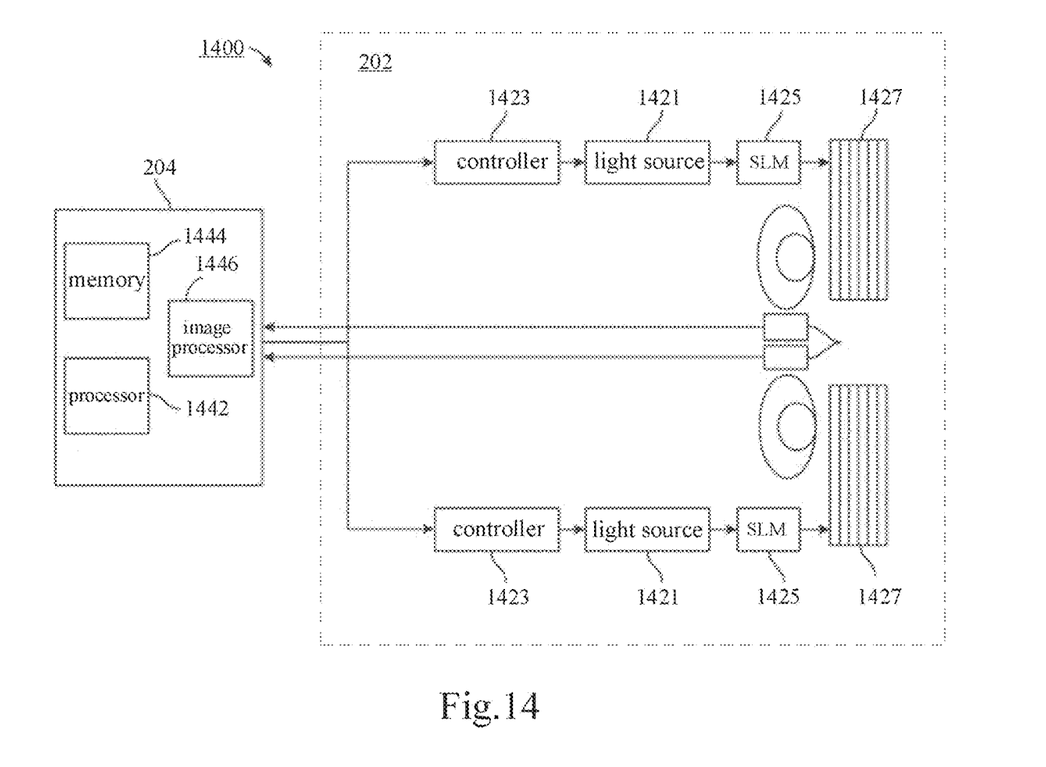
FIG. 14 is a block diagram of an augmented reality system according to an exemplary embodiment.

Taking an AR audio-visual device as an example of the head-mounted audio-visual device, FIG. 14 shows a block diagram of an AR system 1400 according to an exemplary embodiment. The AR system 1400 includes the head-mounted audio-visual device 202 and the wearable control device 204. The head-mounted audio-visual device 202 is a device for outputting (or playing) AR audio-visual information. The wearable control device 204 is connected with the head mounted audio-visual device 202 via a wired connection, such as an interposable cable.

In an embodiment, the head-mounted audio-visual device 202 uses stacked Light-guide Optical Elements (LOE) 1427 as display units for the left and right eyes. The head mounted audio-visual device 202 further includes a light source 1421 for implementing projection, a controller 1423, a spatial light modulator (SLM) 1425, and at least one set of stacked LOEs 1427, which act as a multi-plane focusing system. The AR system 1400 may also include an eye tracking subsystem (not shown). It should be understood that other embodiments may have multiple sets of stacked LOEs 1427.

The wearable control device 204 is configured to generate AR audio-visual information (virtual content for short) to be displayed to the user, and may include an image processor 1446. The image processor 1446 may convert an image or a video associated with the virtual content into a format that may be projected to the user in a 3D manner. For example, when the 3D content is generated, it may be desirable to format the virtual content so that portions of a particular image are displayed at a particular depth plane and other portions are displayed at other depth planes. In one embodiment, all images may be generated at a particular depth plane. In another embodiment, the image processor 1446 may be programmed to provide slightly different images to the right and left eyes so that a 3D stereoscopic effect is presented when viewed together.

The wearable control device 204 may further include a processor 1442 and a memory 1444 as well as other circuits for image generation and processing. The wearable control device 204 may be programmed with the desired virtual content that needs to be presented to the head-mounted audio-visual device 202. The image processor 1446 is configured to execute code in the memory 1444 so as to implement the above described control method of the wearable control device.

The wearable control device 204 is coupled by a cable to the light source 1421 that projects light associated with the desired virtual content to one or more spatial light modulators 1425. The light source 1421 is coupled to the controller 1423. The light source 1421 may include LEDs and lasers having specific colors and disposed in various geometric configurations. In an embodiment, the light source 1421 may include LEDs or lasers of the same color, and each laser is linked to a specific region of the field of view of the display unit. In another embodiment, the light source 1421 may include a wide area emitter, such as an incandescent or fluorescent lamp, having a mask covering layer for segmenting an emission area and position.

In various exemplary embodiments, the SLM 1425 can be reflective, transmissive, or emissive. The type (e.g., speed, size, etc.) of the SLM 1425 can be selected to improve the creation of 3D perceptions. The SLM 1425 encodes light from the light source 1421 with the desired virtual content.

The light from the SLM 1425 is directed to the LOE 1427 such that a light beam encoded by the SLM 1425 with image data of one depth plane and/or color effectively propagates along the single LOE 1427 for delivery to the user's eye. Each LOE 1427 is configured to project an image or sub-image that appears to originate from a desired depth plane or FOV angular position onto the retina of the user. Thus, the light source 1421 and LOE 1427 may selectively project images (synchronously encoded by the SLM 1425 under the control of the controller 1423) that appear to originate from various depth planes or spatial locations. The images are sequentially projected at a sufficiently high frame rate by using each of the light source 1421 and the LOE 1427.

The controller 1423 is in communication with and operably coupled to the wearable control device 204, the light source 1421 and the SLM 1425 to coordinate the synchronized display of images by instructing the SLM 1425 to encode the light beam from the light source 1421 with the appropriate image information from the wearable control device 204.

In an embodiment, the AR system 1400 further includes an eye tracking subsystem configured to track the user's eyes and determine the user's focus. In an embodiment, the system 1400 is configured to select a subset of the activated LOEs 1427 based on input from the eye tracking subsystem such that the image is generated at a desired depth plane consistent with the focus/adjustment of the user.

The structure of the head-mounted audio-visual device 202 is exemplary, and the specific implementation structure of the head-mounted audio-visual device 202 is not limited in this embodiment.

Figure 15:
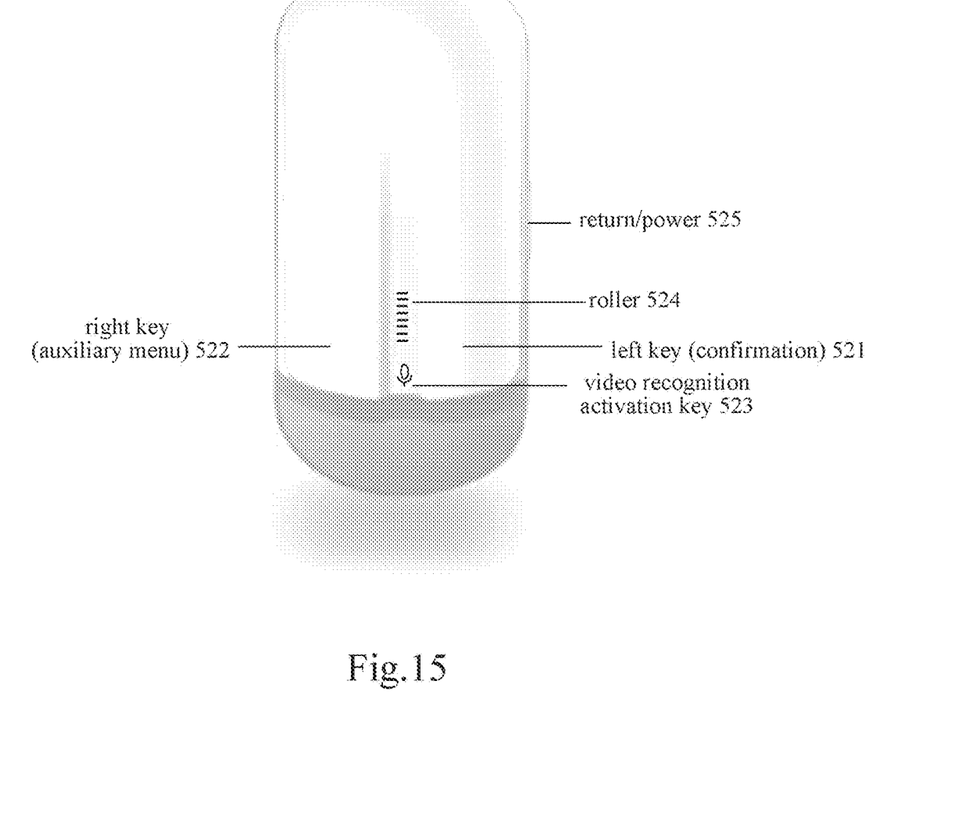
FIG. 15 is a schematic diagram of a wearable control device according to an exemplary embodiment.

FIG. 15 shows a schematic diagram of a wearable control device according to an exemplary embodiment, wherein a surface of a top housing portion of the wearable control device is arc-shaped, and a surface of the top housing portion is provided with a key, and the key includes: a left key (i.e., a confirmation key) 521, a right key (an auxiliary menu may be opened by clicking the right key) 522, a voice recognition activation key (i.e., a voice activation key) 523, a roller 524, a return or power key 525.

The operation of the left key 521 of the wearable control device includes at least one of a single-click operation for confirming a signal of meaning confirmation or similar meaning confirmation, a double-click operation for opening at least one target file of an application, a document, a table, a slide, a picture, a video, and an audio, and a long-press operation for performing at least one operation of selecting files in batches or dragging the files. The right key 522 is used for opening an auxiliary menu when the user performs a single-click operation, and the content of the auxiliary menu changes slightly according to different audio-visual information. The voice activation key 523 may receive a long-press operation or a double-click operation, and when the double-click operation is received by the voice activation key, the computer module in the wearable control device may convert a voice signal acquired by the microphone into text input, or when the long-press operation is received by the voice activation key, the voice signal is converted into text input. The roller 524 is used for generating a numerical value adjustment instruction when the user performs a scrolling or sliding operation, and the numerical value adjustment instruction includes at least one of a volume adjustment instruction, a brightness adjustment instruction, a visual field size adjustment instruction, a scenario size adjustment instruction, a visual angle rotation instruction, a visual angle distance adjustment instruction and an Internet of things device adjustment instruction. In an embodiment, the user can adjust the volume by scrolling the roller, for example, the volume is increased by scrolling the roller upwards (i.e. in the direction in which the user's finger extends), and the volume is decreased by scrolling the roller downwards (i.e. in the direction in which the user's finger retracts). The return or power key 525 is used for returning to the homepage or the upper menu when the user performs a single-click operation, or is used for at least one operation of a turn-on operation, a turn-off operation, a restart operation, and a power-off signal. For example, when the return or power key 525 is long-pressed for 2 seconds, if the wearable control device is in a turn-on state, the wearable control device is turned on, and if the wearable control device is in a turn-off state, the wearable control device is turned off, or when the return or power key 525 is long-pressed for 6 seconds, if the wearable control device is in a turn-on state, the power of the wearable control device is powered off.

The user may also use the above-described keys in combination to implement different functions, for example, press two keys or press the pressing portion simultaneously to trigger a preset function, which is not limited in this embodiment. In some embodiments, functions of the physical remote control units support user customization, and the user defines a function or shortcut corresponding to each physical remote control unit.

The above description is only the exemplary embodiments of the present disclosure, and is not intended to limit the present disclosure, and any modifications, equivalent substitutions, improvements, etc. that are within the spirit and principle of the present disclosure are intended to be included within the scope of the present disclosure.

What is claimed is:

1. A wearable control device for connecting with a head-mounted audio-visual device, the wearable control device comprising:
   a housing;
   at least one physical remote control unit disposed on the housing;
   a processor disposed inside the housing and electrically connected with the physical remote control unit;
   wherein the processor is configured to:
   generate audio-visual information output by the head-mounted audio-visual device, the audio-visual information including at least one of virtual reality (VR) audio-visual information, augmented reality (AR) audio-visual information, or mixed reality (MR) audio-visual information;
   generate a control signal of the audio-visual information according to a user operation received by the physical remote control unit; and
   control output of the audio-visual information according to the control signal,
   wherein the housing comprises a top housing portion and a bottom housing portion arranged in parallel, and tail portions of the top housing portion and the bottom housing portion are connected through a transition portion;
   the physical remote control unit is disposed on a top surface of the top housing portion; and
   a gap is formed between opposite outer surfaces of the top housing portion and the bottom housing portion, to secure the wearable control device to a user's clothing;
   wherein the physical remote control unit comprises a first pressing portion and a second pressing portion arranged in parallel on an edge area of the top surface of the top housing portion, and the edge region is a localized region of the top surface away from the transition portion;
   wherein the physical remote control unit further comprises a first key and a roller disposed between the first pressing portion and the second pressing portion;
   wherein the processor is configured to receive a voice signal when the user operation is received by the first key; and
   wherein the processor is configured to generate a numerical value adjustment instruction when the user operation is received by the roller.

2. The wearable control device according to claim 1, wherein the processor is configured to:
   generate at least one of a confirmation signal, a drag control signal, or a multiple-choice control signal matched with the audio-visual information when the user operation is received by the first pressing portion; and
   generate an auxiliary menu control signal matched with the audio-visual information when the user operation is received by the second pressing portion.

3. The wearable control device according to claim 1, wherein the processor is configured to:
   generate a voice control signal according to the voice signal, or convert the voice signal into text input.

4. The wearable control device according to claim 1, wherein the numerical value adjustment instruction comprises at least one of: a volume adjustment instruction, a brightness adjustment instruction, a visual field size adjustment instruction, a scenario size adjustment instruction, a visual angle rotation instruction, a visual angle distance adjustment instruction, or an Internet of things device adjustment instruction.

5. The wearable control device according to claim 1, wherein the physical remote control unit further comprises a second key disposed on a side surface of the bottom housing portion.

6. The wearable control device according to claim 5, wherein the processor is configured to generate at least one control signal of a return signal, a previous page signal, or a screen capture signal when the user operation is received by the second key.

7. The wearable control device according to claim 6, wherein the processor is configured to generate at least one control signal of a turn-on signal, a turn-off signal, a restart signal, or a power-off signal when the user operation is received by the second key.

8. The wearable control device according to claim 1, wherein the transition portion is provided with a connecting wire for connecting with the head-mounted audio-visual device.

9. The wearable control device according to claim 1, wherein a length of the top housing portion is shorter than a length of the bottom housing portion.

10. A wearable control device for connecting with a head-mounted audio-visual device, the wearable control device comprising:
    a housing including a top housing portion and a bottom housing portion arranged in parallel, wherein a gap is formed between two opposite outer surfaces of the top housing portion and the bottom housing portion, to secure the wearable control device to a user's clothing, and tail portions of the top housing portion and the bottom housing portion are connected through a transition portion;

at least one physical remote control unit disposed on a top surface of the top housing portion; and a processor disposed inside the housing and electrically connected with the physical remote control unit;

wherein the physical remote control unit comprises a first pressing portion and a second pressing portion arranged in parallel on an edge area of the top surface of the top housing portion, and the edge region is a localized region of the top surface away from the transition portion;

wherein the physical remote control unit further comprises a first key and a roller disposed between the first pressing portion and the second pressing portion;

wherein the processor is configured to receive a voice signal when the user operation is received by the first key; and wherein the processor is configured to generate a numerical value adjustment instruction when the user operation is received by the roller.

11. The wearable control device according to claim 10, wherein the processor is configured to:

generate audio-visual information output by the head-mounted audio-visual device, wherein the audio-visual information includes at least one of virtual reality (VR) audio-visual information, augmented reality (AR) audio-visual information, or mixed reality (MR) audio-visual information;

generate a control signal of the audio-visual information according to a user operation received by the physical remote control unit; and control output of the audio-visual information according to the control signal.

12. A virtual/augmented reality system, comprising:
a head-mounted audio-visual device; and
a wearable control device connected with the head-mounted audio-visual device;
wherein the wearable control device is the wearable control device according to claim 10.

* * * * *